(12) United States Patent
Wu (10) Patent No.: US 8,705,874 B2
(45) Date of Patent: Apr. 22, 2014

(54) IMAGE PROCESSING METHOD AND SYSTEM USING REGIONALIZED ARCHITECTURE

(75) Inventor: Yi-Ta Wu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1070 days.

(21) Appl. No.: 12/726,352

(22) Filed: Mar. 18, 2010

(65) Prior Publication Data

US 2011/0110598 A1 May 12, 2011

(30) Foreign Application Priority Data

Nov. 11, 2009 (TW) ............................... 98138271 A (51) Int. Cl.
*G06K 9/62* (2006.01)
*G06K 9/64* (2006.01)
(52) U.S. Cl.
USPC .......................................... 382/224; 382/279
(58) Field of Classification Search
None
See application file for complete search history.

(56) References Cited

U.S. PATENT DOCUMENTS

| | | | |
|---|---|---|---|
| 5,832,138 | A | 11/1998 | Nakanishi et al. |
| 7,298,918 | B2 | 11/2007 | Sumitomo et al. |
| 7,324,701 | B2 | 1/2008 | Nakami |
| 2007/0206844 | A1 * | 9/2007 | Russakoff et al. ............ 382/132 |

OTHER PUBLICATIONS

Sun, Te-Hsiu, "K-Cosine Corner Detection," Jul. 2008, Journal of Computers, vol. 3, No. 7, 7 pages.*
Nain, Neeta et al., "Corner Detection using Difference Chain Code as Curvature," Mar. 21, 2008, Proceedings of the International MultConfernece of Engineers and Computer Scientists (IMECS) 2008, vol. I, 6 pages.*
Anderson, David L. et al., "Introduction to Chain Codes," Sep. 1, 2006, Consortium on Mind/Brain Science Instruction (CMBI), www.mind.ilstu.edu/curriculum/chain_codes_intro/chain_codes_intro.php, 10 pages.*
Song Gao et al., " Image Segmentation and Selective Smoothing by Using Mumford-Shah Model," IEEE Trans. On Image Processing, vol. 14, No. 10, Oct. 2005, pp. 1537-1549.

* cited by examiner

*Primary Examiner* — Jason M Repko
*Assistant Examiner* — Ryan P Potts
(74) *Attorney, Agent, or Firm* — Jianq Chyun IP Office (57) ABSTRACT

An image processing method and an image processing system using a regionalized architecture are provided. In the method, a plurality of neighborhood pixels having at least one similarity characteristic in an image are classified into a group region having the same characteristics. Then, a unique group mark is assigned to each of the group regions, a regionalized chain code is used to describe an edge of each group region, such that subsequent image processing procedures can be applied to the neighborhood pixels of a currently processed pixel having same group mark. Therefore, the group regions can be recognized according to the group mark and regionalized chain code thereof, so as to simultaneously perform image processing procedures on those group regions.

25 Claims, 8 Drawing Sheets

IMAGE PROCESSING METHOD AND SYSTEM USING REGIONALIZED ARCHITECTURE

CROSS-REFERENCE TO RELATED APPLICATION

This application claims the priority benefit of Taiwan application serial no. 98138271, filed on Nov. 11, 2009. The entirety of the above-mentioned patent application is hereby incorporated by reference herein and made a part of specification.

BACKGROUND

1. Field

The disclosure is related to an image processing method and an image processing system using a regionalized structure.

2. Description of Related Art

Modern image processing technique adopts a plurality of basic image processing units, such as a smooth processing unit, a de-noise processing unit, a edge detection unit, a corner detection unit, a straight line detection unit, and a curve line detection unit, to optimize original images or obtain effective image characteristics. However, the calculations of these basic units are all based on a point structure, in which neighboring pixels are used to accomplish calculation requirement of each kind of image processing procedure. When performing a specific basic unit, a result corresponding to each pixel is generated according to the neighboring pixels around the currently processed pixel, and the calculation results of the pixels are gathered as a processed result.

Figure 1:
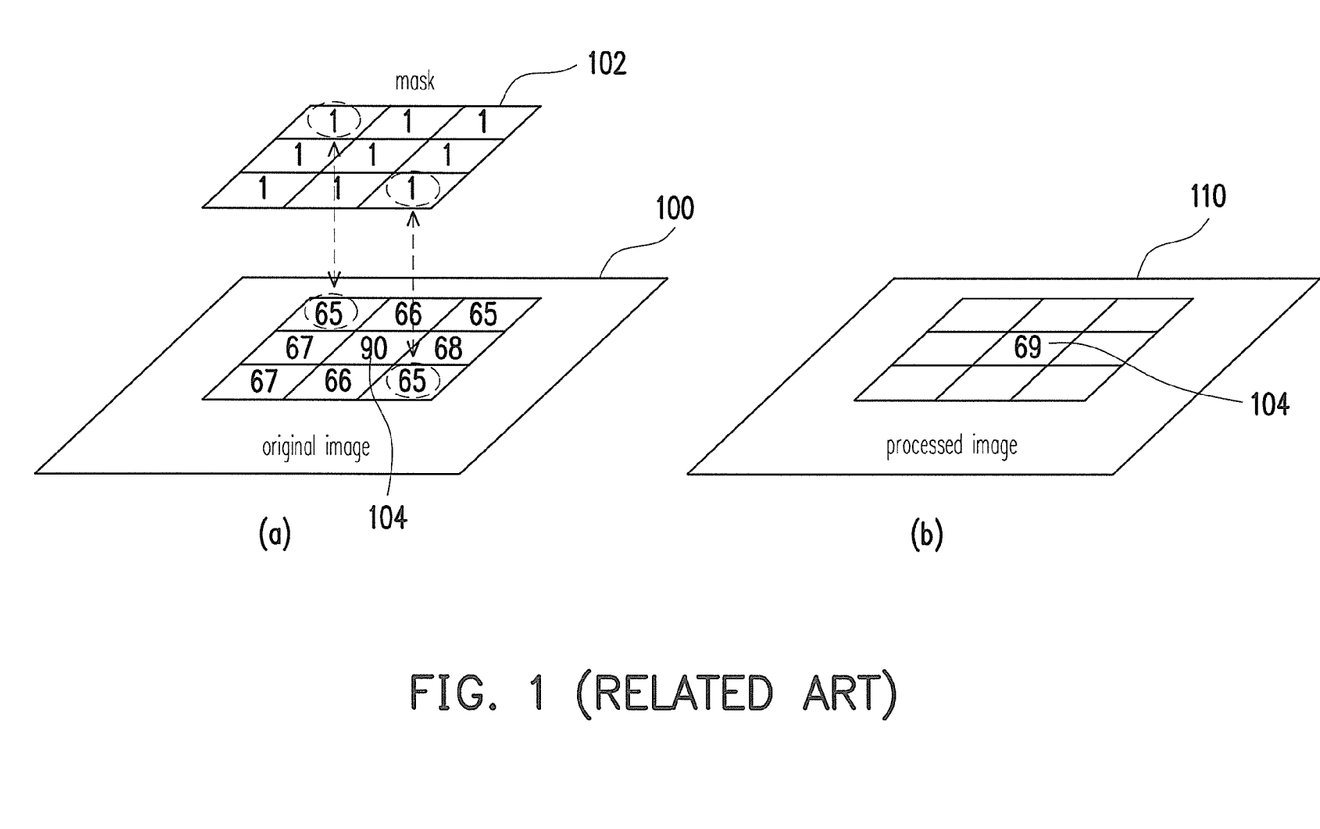
FIG. 1(a) and FIG. 1(b) are examples of conventional smooth/de-noise processing using a point structure.

FIG. 1(a) and FIG. 1(b) are examples of conventional smooth/de-noise processing using a point structure. Wherein, FIG. 1(a) illustrates that when performing a smooth/de-noise processing on an original image 100, a mask 102 with a size of 3*3 is moved on an image through an up-toward-down and left-toward-right method. In the calculation of each pixel, the values of the mask 102 are respectively multiplied by the pixel values of the pixels in the corresponding location and then the calculated products are added together, which is referred to as a convolution calculation. The convolution is further divided by a sum of values of the mask 102, so as to obtain an image 110 processed by the smooth/de-noise processing. For example, to perform the smooth/de-noise processing on the pixel 104 of original image 100, the pixel itself and its eight neighboring pixels are respectively multiplied by the values of the mask 102, the products are added together and then divided by a sum of values of the mask 102, which is (1*65+1*66+1*65+1*67+1*90+1*68+1*67+1*66+1*65)/9. Finally, the obtained pixel value of 69 is used as the processed result of pixel 104 after the smooth/de-noise processing. However, after the smooth processing is accomplished, the characteristics of the edge of the image are blurred.

Figure 2:
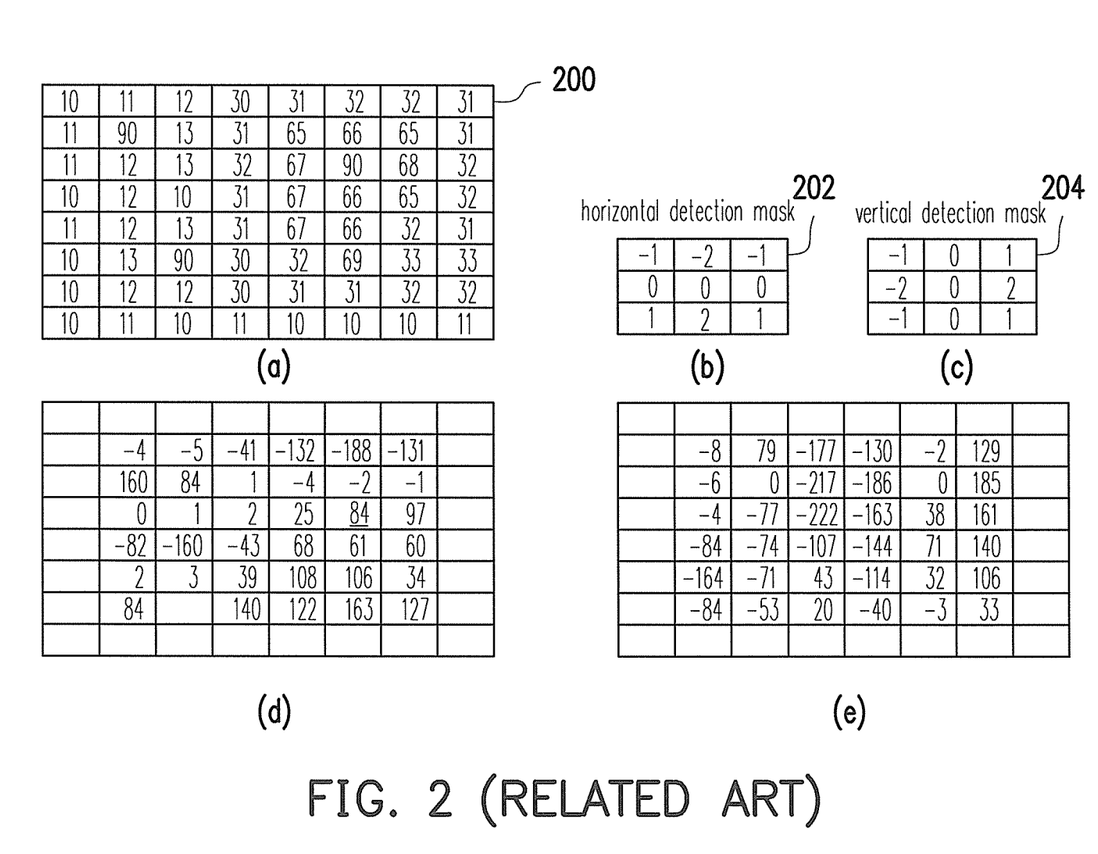
FIG. 2(a) to FIG. 2(e) are examples of conventional edge detection using a point structure.

FIG. 2(a) and FIG. 2(e) are examples of conventional edge detection using a point structure. Wherein, FIG. 2(a) is an original image 200 having a size of 8*8. FIG. 2(b) and FIG. 2(c) are respectively a mask 202 for detecting a horizontal edge and a mask 204 for detecting a vertical edge. FIG. 2(d) and FIG. 2(e) are results of the horizontal detection and vertical detection performed on the original image 200, respectively. To determine an edge pixel, the conventional edge detecting method also moves the horizontal detection mask 202 and the vertical detection mask 204 on the original image 200 to obtain convolution results as shown in FIG. 2(d) and FIG. 2(e), and finally determines the edge according a gradient of the pixels in the processed image. Although the horizontal and vertical edge pixels can be detected successfully through aforesaid edge detecting method, the corresponding region of each edge pixel is still unknown.

Figure 3:
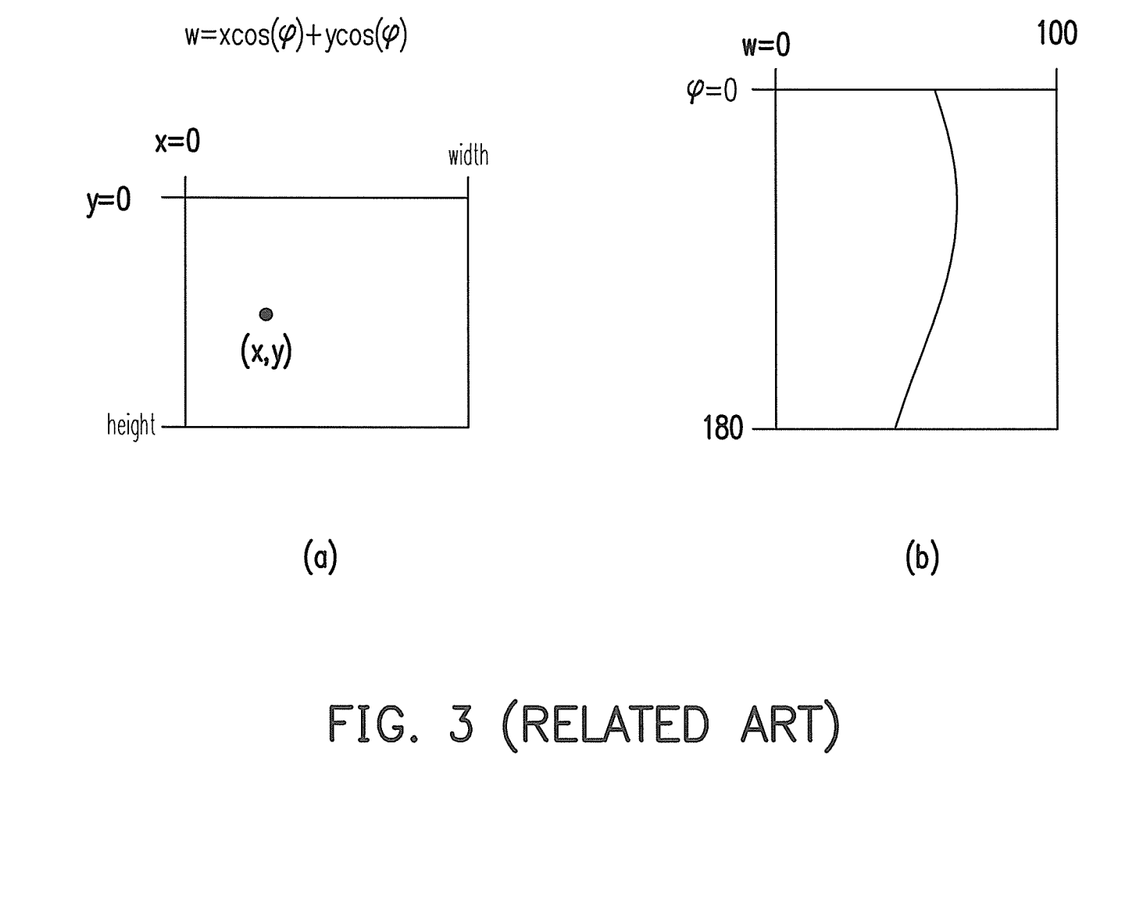
FIG. 3(a) and FIG. 3(b) are examples of conventional straight line detection using a point structure.

FIG. 3(a) and FIG. 3(e) are examples of conventional straight line detection using a point structure. Wherein, FIG. 3(a) represents a point (x, y) in a two-dimensional space. The point (x,y) can be further transformed into a corresponding w value through following coordinate-transforming formula.

$$w = x\cos(\phi) + y\sin(\phi) \qquad (1)$$

Wherein, since x and y are already known, the values of w corresponding to each of different variables φ (from 0 degree to 180 degrees) can be obtained, so as to generate an accumulated matrix as shown in FIG. 3(b). In the x-y space, each point can be transformed into a curve line in the w-φ space. The number of curve lines that cross by an intersection point having most curve lines crossed by represents a number of straight lines in the x-y space. Although the number of straight lines can be obtained through aforesaid straight line detecting method, the region corresponding to each of the straight lines is still unknown.

Therefore, the conventional image processing technique based on a point structure has following major defects.

First, it is unable to understand the pixel property of an image, such that, in practice, the calculation has to be performed on all the pixels so as to obtain a result. However, if the characteristic of each pixel (e.g. whether the pixel is a noise pixel or an edge point) can be obtained before the calculation, the edge detection or the corner detection can be limited to be performed on these pixels, such that the cost of calculation can be reduced.

Second, it is unable to obtain differences between the properties of the pixel and its neighboring pixels, such that all the neighboring pixels have to be used in the calculation. However, if the differences between the properties of each pixel and its neighboring pixels (e.g. whether the neighboring pixel is a noise pixel) can be obtained before the calculation, the neighboring pixels having different properties can be ignored, such that the errors can be reduced.

Third, additional steps are required to correct the image characteristics changed due to the basic calculation. For example, for detecting a straight line in an image, the conventional image processing technique has to use the smooth processing unit and de-noise processing unit to remove the noise. As a result, a number of edge pixels of the image is increased. In other words, when executing the edge detection unit, a thick line is expected to be detected. At this time, an additional thinning processing unit has to be executed, so as to obtain a skeleton of the thick line. Then, the straight line detection unit can be used to detect the straight line in the image.

Fourth, multiple basic image processing units cannot be effectively integrated and executed in parallel. For example, for performing three basic image processing units including a straight line detection unit, a curve line detection unit and a corner detection unit, commonly used information, excluding the pixel information after smooth processing and edge detection, has to be calculated separately. In other words, these detections cannot be processed in parallel to reduce unnecessary calculation.

Fifth, the image after being processed by the basic units cannot provide additional information for the succeeding advanced image processing units to reference. For example, the edge detection unit can only detect the edge pixels in an image, but is not able to know which edge pixels belong to the same region (object). Therefore, no regionalized information can be provided for the succeeding advanced image processing units like image dividing unit or graph recognition unit to effectively performing processing procedures.

It is known from the above that the conventional image processing technique based on a point structure still has various defects. How to simultaneously execute basic image processing units so as to reduce unnecessary calculation and provide more information for the succeeding advanced image processing units has become a major issue in the image processing field.

SUMMARY

Accordingly, the disclosure provides an image processing method using a regionalized structure, which classifies a plurality of neighboring pixels having similarity characteristics into a group region, so as to simultaneously perform image processing procedures on the group regions.

The disclosure provides an image processing system using a regionalized structure, which uses regionalized chain codes to describe a plurality of group regions in an image, so as to provide more information for the succeeding advanced image processing units.

The disclosure provides an image processing method using a regionalized architecture. Wherein, a plurality of neighborhood pixels having at least one similarity characteristic in an image are classified into a group region having the same characteristics. Then, a unique group mark is assigned to each of the group regions, and a regionalized chain code is used to describe an edge of each group region. According to the group mark and the regionalized chain code of each group region, at least one image processing procedures can be simultaneously applied to those group regions.

The disclosure provides an image processing system using a regionalized structure, which comprises a grouping pre-processing unit, a marking pre-processing unit, a describing pre-processing unit, and a basic image processing unit. Wherein, the grouping pre-processing unit is used for classifying a plurality of neighboring pixels having at least one similarity characteristic in an image into a group region having the same characteristics. The marking pre-processing unit is used for assigning a unique group mark to each of the group regions. The describing pre-processing unit is used for describing an edge of each group region as a regionalized chain code. The basic image processing unit is used for identifying each of the group regions according to the group mark and the regionalized chain code of the group region, so as to simultaneously perform image processing procedures on these group regions.

Based on the above, the image processing method and image processing system using the regionalized structure of the disclosure classify a plurality of pixels having similarity characteristics into a group region, assigns a unique group mark to each of the group regions, and provides a regionalized chain code for describing an edge of each group region, such that succeeding image processing procedures can be simultaneously applied to the group regions.

In order to make the aforementioned and other features and advantages of the present disclosure more comprehensible, several embodiments accompanied with figures are described in detail below. The specification of the disclosure provides various embodiments to illustrate technical features of different implementations of the disclosure. Wherein, the disposition of each element in the exemplary embodiment is provided for the use of illustration, and is not used to limit the scope of the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 10A and FIG. 10B are examples illustrating an image processing method using a regionalized structure according to an exemplary embodiment of the present disclosure.

DESCRIPTION OF THE EXEMPLARY EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

The disclosure provides a whole new image processing structure, which defines three regionalized image pre-processing units, so as to transform the original image from combinations of pixel points into a plurality of region combinations, so as to advance the structure of image processing from a conventional point structure to a regionalized structure. Accordingly, the image processing technique using the new structure can effectively integrate and simultaneously execute various kinds of basic image processing units such as smooth processing unit, edge detection unit, corner detection unit, straight line detection unit and curve line detection unit. In addition, the image processing technique of the present disclosure also provides more information (e.g. regionalized data structure) for the advanced image processing units. Exemplary embodiments are given below for illustrating detailed content of the image processing method and the image processing system of the present disclosure.

Figure 4:
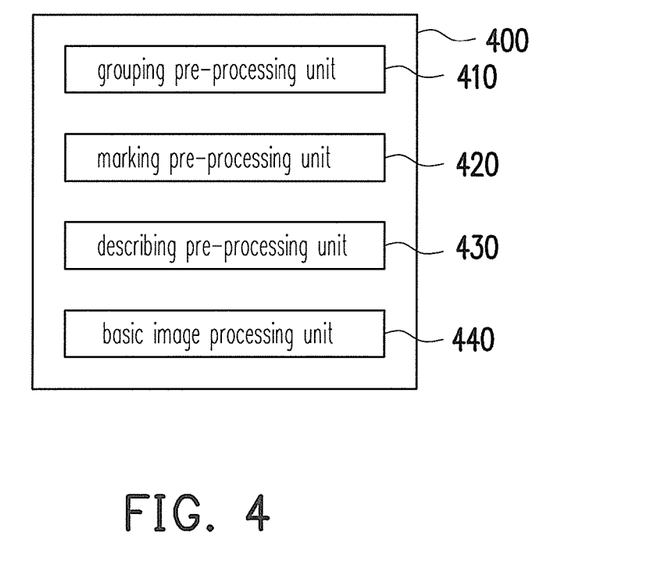
FIG. 4 is a block diagram illustrating an image processing system using a regionalized structure according to an exemplary embodiment of the present disclosure.
Figure 5:
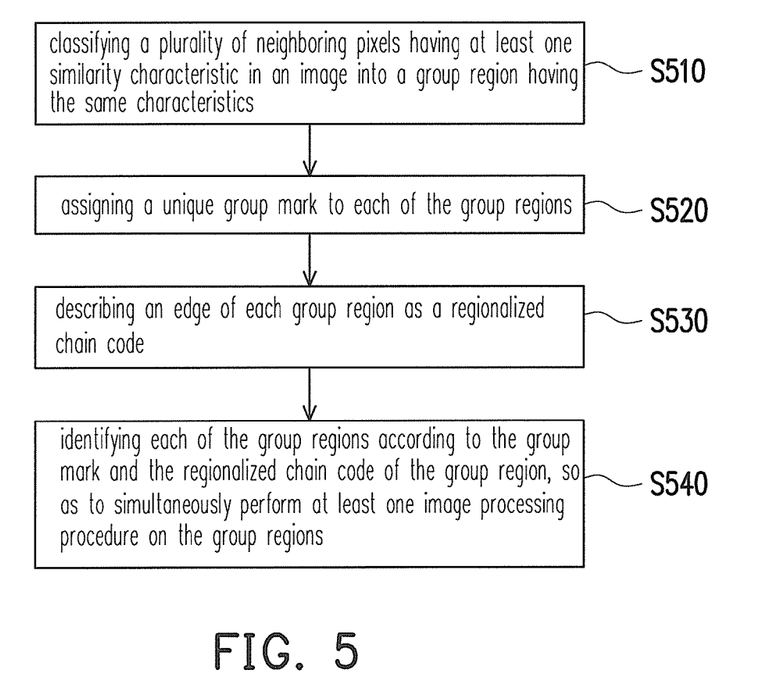
FIG. 5 is a flowchart illustrating an image processing method using a regionalized structure according to an exemplary embodiment of the present disclosure.

FIG. 4 is a block diagram illustrating an image processing system using a regionalized structure according to an exemplary embodiment of the disclosure, and FIG. 5 is a flowchart illustrating an image processing method using a regionalized structure according to an exemplary embodiment of the disclosure. Referring to the FIG. 4 and FIG. 5, the image processing system 400 of the present exemplary embodiment divides image processing procedures into a regionalizing pre-processing stage and an image processing stage. The image processing system 400 comprises a grouping pre-processing unit 410, a marking pre-processing unit 420, a describing pre-processing unit 430 and a basic image processing unit 440, and the functions thereof are described in the following.

In the regionalizing pre-processing stage, the grouping pre-processing unit 410 classifies a plurality of neighboring pixels having at least one similarity characteristic in an image into a group region having the same characteristics according a similarity rules defined therein (step S510). Wherein, the grouping pre-processing unit 410 performs a quantization process on the image, so as to quantize each of the pixel values of a plurality of pixels in the image to one of a plurality of quantization values. Then, the grouping pre-processing unit 410 classifies the connected pixels having the same quantization value into a group region having the same characteristics (or color).

Figure 6:
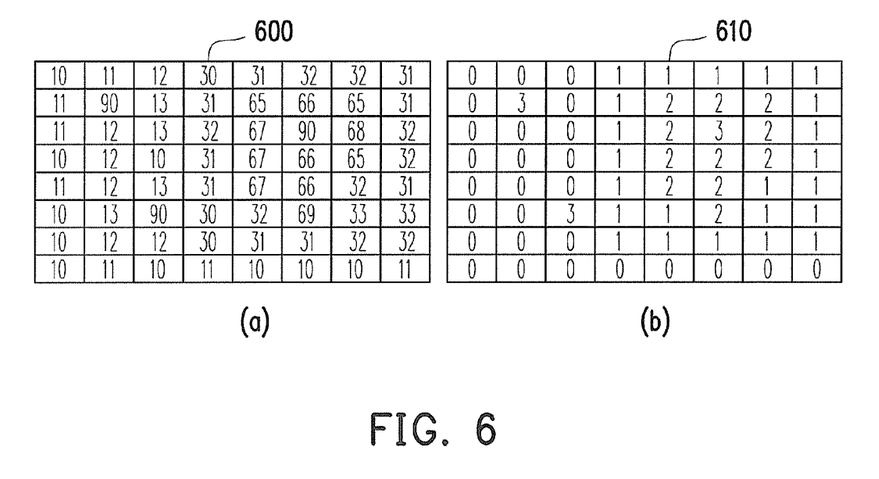
FIG. 6(a) and FIG. 6(b) are examples illustrating an image quantization process according to an exemplary embodiment of the present disclosure.

For example, FIG. 6(a) and FIG. 6(b) are examples illustrating an image quantization process according to an exemplary embodiment of the present disclosure. Wherein, FIG. 6(a) illustrates pixel values of the pixels in an original image 600. The exemplary embodiment assumes a range of the pixel values of the original image 600 is from 1 to 100. When the pixel value is between 1 and 25, the pixel value is quantized to 1; when the pixel value is between 26 and 50, the pixel value is quantized to 2; when the pixel value is between 51 and 75, the pixel value is quantized to 3; when the pixel value is between 76 and 100, the pixel value is quantized to 4. After performing the quantization process on the original image 600 according to the aforesaid rules, a quantization result 610 as shown in FIG. 6(b) is obtained.

Next, the marking pre-processing unit 420 assigns a unique group mark to each of the group regions classified by the grouping pre-processing unit 410. Wherein, the marking pre-processing unit 420, for example, uses a connected components labelling labeling method to assign the group mark.

For example, FIG. 7(a) and FIG. 7(b) are examples illustrating a method for assigning a group mark according to an exemplary embodiment of the present disclosure. Wherein, FIG. 7(a) uses the quantization result 610 of FIG. 6(b). The present exemplary embodiment assigns a unique group mark to the group region in FIG. 6(a) comprising connected pixels having the same quantization value. For example, a group mark of A is assigned to the group region having an quantization value of 0, a group mark of B is assigned to the group region having an quantization value of 1, and a group mark of D is assigned to the group region having an quantization value of 2. It is noted herein that although there are three group regions having the quantization value of 3, those group regions are not connected with each other, such that the present exemplary embodiment considers each of those three group regions as independent regions and respectively assigns the group marks C, E and F to them, so as to obtain a group marking result 620 as shown in FIG. 7(b).

In addition to assign the group mark, the image processing system 400 of the exemplary embodiment also uses chain codes to describe the edge of each group region so as to obtain a regionalized chain code through the describing pre-processing unit 430 (step S530). In detail, the describing pre-processing unit 430 defines a plurality of chain codes corresponding to a plurality of different directions, starts describing the edge from, for example, the pixel in the upper-left corner, and sequentially acquires a relative direction between two neighboring pixels along the edge of the group region in a counterclockwise direction or a clockwise direction, and records the chain codes corresponding to the relative directions as the regionalized chain code.

For example, FIG. 8(a), FIG. 8(b), FIG. 8(c) and FIG. 8(d) are examples illustrating a chain code and a method for describing regionalized characteristics according to an exemplary embodiment of the present disclosure. Wherein, FIG. 8(a) uses the group marking result 620 of FIG. 7(b). The exemplary embodiment uses chain codes to describe the edge of each of the group regions in the FIG. 8(a). FIG. 8(b) illustrates chain codes corresponding to a plurality of different directions, wherein the directions of right, upper-right, upward, upper-left, left, lower-left, downward, and lower-right correspond to chain codes of 0 to 7, respectively. FIG. 8(c) lists the regionalized chain codes of the group regions obtained after chain code description. FIG. 8(d) lists the regionalized attributes of each of the group regions, in which the regionalized attributes comprises a size, an average luminance, a starting point, and a circumference of the group region. Take group region A as an example, the chain code describing method of the exemplary embodiment starts from a pixel (0,0) in the upper-left corner, acquires a relative direction between two neighboring pixels along the edge of the group region A in a counterclockwise direction, and records a chain code corresponding to the relative direction. Wherein, pixel (0,1) is located under pixel (0,0), such that a chain code of 6 corresponding to a downward direction is recorded. Similarly, the following pixels (0,2), . . . , (0,7) are all located under the previous pixel, such that six chain codes of 6 are recorded. Afterward, the edge of the group region A turns to a right direction and pixel (1,7) is located in the right of pixel (0,7), such that a chain code of 0 corresponding to the right direction is recorded. The rest may be deduced by analogy, when the description of chain code returns to pixel (0,0), a regionalized chain code of the group region A is obtained. Similarly, the regionalized chain codes of other group regions can also be obtained through this manner.

After the marking and edge description of each group region are completed, the regionalizing pre-processing stage is ended and the image processing stage is entered.

Figure 9:
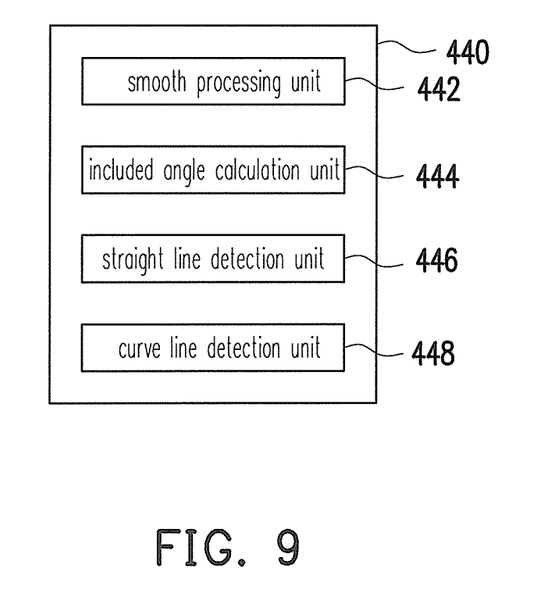
FIG. 9 is a block diagram of a basic image processing unit according to an exemplary embodiment of the present disclosure.

Meanwhile, according to the need of calculation, the basic image processing unit 440 identifies each of the group regions by using the group mark and the regionalized chain code thereof, so as to simultaneously perform image processing procedures on these group regions (step S540). Wherein, the aforesaid image processing procedures comprises basic image processing procedures such as smooth processing, corner detection, straight line detection, and curve line detection. Accordingly, the basic image processing unit 440 disposes a smooth processing unit 442, an included angle calculation unit 444, a straight line detection unit 446, a curve line detection unit 448 (as shown in FIG. 9) to execute those basic image processing procedures. The detailed steps of these image processing procedures are respectively introduced in the following.

About smooth processing: The smooth processing unit 442 may obtain edge information of a group region from the regionalized chain code of the group region. Therefore, in the practice of smooth processing, only the pixels around the currently processed pixel and belonged to the same group region as the currently processed pixel are used for calculation. In other words, the averaging mask used by the smooth processing unit 442 only works on the pixels within the group region of the currently processed pixel, and the calculation of smooth processing does not perform on the pixels outside the group region. Accordingly, the smooth processing of the exemplary embodiment may avoid a result of edge blur resulting from the multiplication of pixels of other regions.

About corner detection: The included angle calculation unit 444 may retrieve arbitrary three connected neighboring pixels $P_0$ ($x_0,y_0$), $P_1$ ($x_1,y_1$), $P_2$ ($x_2,y_2$) from an edge of each group region based on the regionalized chain code of the group region to acquire a relative direction among the three connected neighboring pixels. The following cosine formula is used to calculate an included angle θ formed by the three connected neighboring pixels. That is, the angle between vectors $\overrightarrow{P_0P_1}$ and $\overrightarrow{P_0P_2}$.

$$\cos\theta = \frac{(x_1 - x_0)(x_2 - x_0) + (y_1 - y_0)(y_2 - y_0)}{\sqrt{(x_1 - x_0)^2 + (y_1 - y_0)^2} \times \sqrt{(x_2 - x_0)^2 + (y_2 - y_0)^2}} \quad (2)$$

Wherein, a corner property of the pixel ($x_0,y_0$) can be determined according to the included angle θ. For example, if the included angle θ is equal to 90 degrees, it indicates the pixel is a corner pixel having a right angle.

About straight line detection: The straight line detection unit 446 may determine whether a straight line is among the pixels by analyzing the included angles of the pixels calculated by the included angle calculation unit 444. Wherein, when the straight line detection unit 446 finds out a plurality of neighboring pixels having an included angle of 180 degrees, it is determined that a straight line is among the neighboring pixels and a length of the straight line is equal to a number of the neighboring pixels having the included angle of 180 degrees.

For example, Table 1 lists the angle values corresponding to a plurality of pixels in the group region C. Wherein, it is known from the pixels of C(2) to C(7) having the included angles of 180 degrees that a straight line is formed by the pixels of C(2) to C(7) and a length of the straight line is equal to 6.

TABLE 1

| | pixel | | | | | | | |
|---|---|---|---|---|---|---|---|---|
| | C(1) | C(2) | C(3) | C(4) | C(5) | C(6) | C(7) | C(8) ... |
| anlge | 90 | 180 | 180 | 180 | 180 | 180 | 180 | 90 ... |

About curve line detection: The curve line detection unit 448 may determine whether a curve line is among the pixels by analyzing the included angles of the pixels calculated by the included angle calculation unit 444. Wherein, when the curve line unit 448 finds out a plurality of neighboring pixels having the same included angle but not equal to 180 degrees, it is determined that a curve line is among the neighboring pixels and a length of the straight line is equal to a number of the neighboring pixels.

For example, Table 2 lists the angle values corresponding to a plurality of pixels in the group region D. Wherein, it is known from the pixels of D(2) to D(7) having the included angles of 145 degrees that a curve line is formed by the pixels of D(2) to D(7) and a length of the curve line is equal to 6.

TABLE 2

| | pixel | | | | | | | |
|---|---|---|---|---|---|---|---|---|
| | D(1) | D(2) | D(3) | D(4) | D(5) | D(6) | D(7) | D(8) ... |
| angle | 90 | 145 | 145 | 145 | 145 | 145 | 145 | 90 ... |

It is known from the above that the image processing system of the disclosure may simultaneously perform image processing procedures on the group regions in the image processing stage according to the information of the group marks and regionalized chain codes obtained in the regionalizing pre-processing stage.

Figure 8:
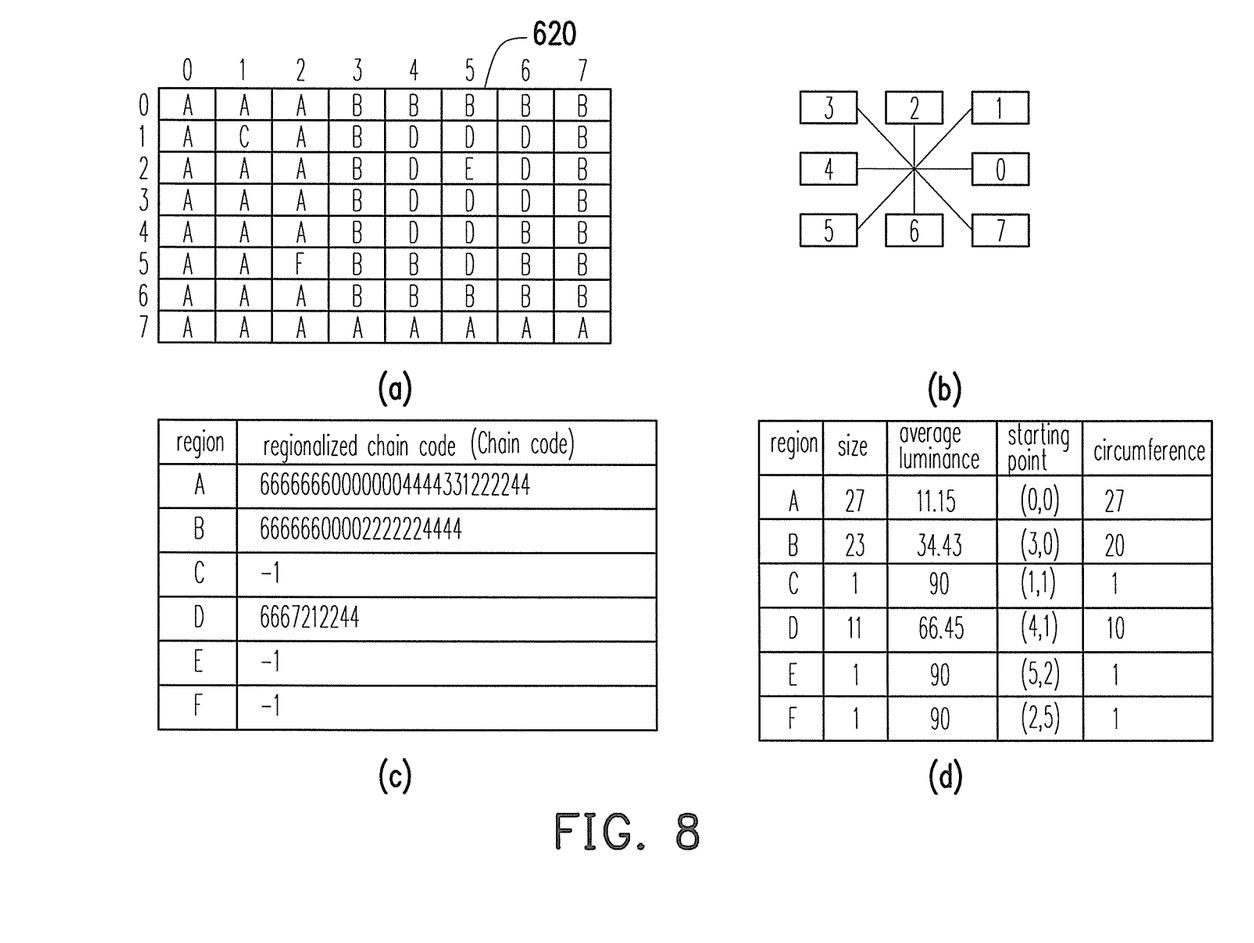
FIG. 8(a) to FIG. 8(d) are examples illustrating a chain code and a method for describing a regionalized characteristic according to an exemplary embodiment of the present disclosure.

It is noted herein that, before the image processing procedures, the image processing system 400 may use a sorting unit (not shown) to sort the group regions according to regionalized attributes such as a size, a circumference, or an average luminance of each group region (as shown in FIG. 8(*d*)). In the practice of image processing, an overall calculation load of the system may be considered, such that only a portion of group regions in the head of the sequence are selected and processed.

To further illustrate the feature of simultaneously performing a plurality of image processing procedures of the disclosure, an exemplary embodiment is given below to illustrate a procedure of simultaneously performing a plurality of image processing procedures on one pixel by another pixel in the edge of the group region.

Figure 7:
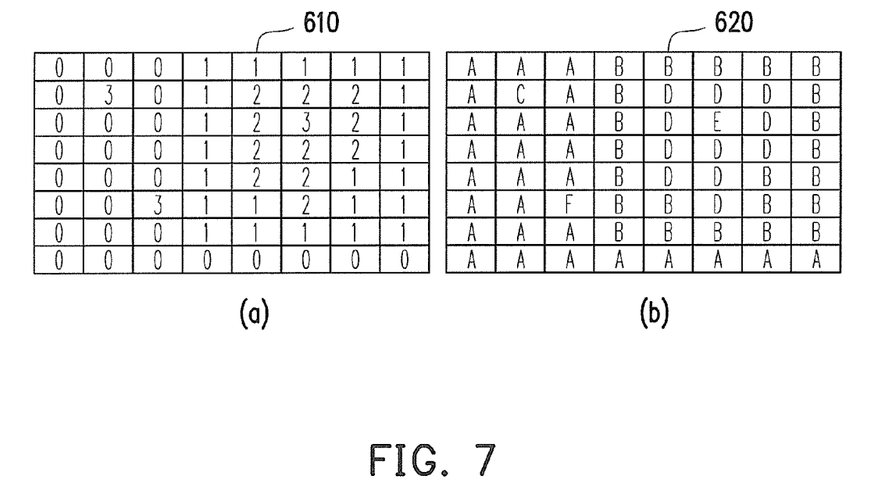
FIG. 7(a) and FIG. 7(b) are examples illustrating a method for assigning a group mark according to an exemplary embodiment of the present disclosure.
Figure 10A:
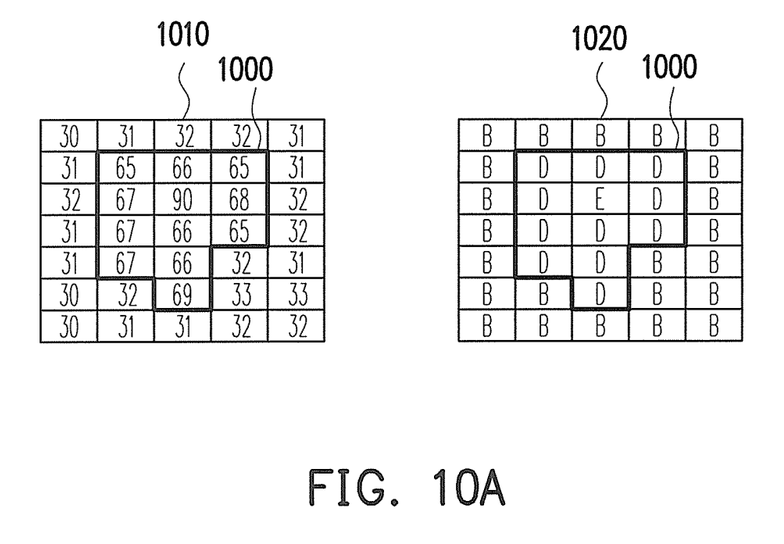

FIG. 10A and FIG. 10B are examples illustrating an image processing method using a regionalized structure according to an exemplary embodiment of the present disclosure. In FIG. 10A of the exemplary embodiment, an original image 1010 and a group marking result 1020 of the group region having the group mark of D are picked from a group marking result shown by FIG. 7(*b*), and image processing calculations such as smooth processing, edge detection, angle calculation, straight line detection and curve line detection are simultaneously performed on each of the pixels in the group region 1000 (drawn in a thick black line). Each stage in the following represents an edge pixel to be sequentially processed according to the regionalized chain code thereof. In addition, to simplify the steps for the smooth procedure, a definition of 4-connectivity neighboring pixels is used as calculation basis of image processing.

In stage (1), the image processing system performs processing on the pixel in the upper-left corner of the group region 1000. Wherein, when performing smooth processing, only the neighboring pixels (i.e. right pixel and bottom pixel) belonging to the same region as the currently processed pixel and the currently processed pixel itself are used for performing the convolution calculation, and a processed result is obtained by averaging the convolution, which is (65*1+66*1+67*1)/3=66. When performing edge detection, the pixel is determined as the edge pixel according to the regionalized chain code of the group region 1000 and is marked with E. When performing angle calculation, an included angle formed by the currently processed pixel and its neighboring pixels (i.e. right pixel and bottom pixel) is calculated and a calculation result of 90 degrees is obtained. When performing straight line and curve line detection, the currently processed pixel is not able to be determined as a portion of a straight line or a curve line since currently only one pixel is processed.

In stage (2), the image processing system performs processing on the second pixel in the left column of the group region 1000. Wherein, when performing smooth processing, only the neighboring pixels (i.e. top pixel and bottom pixel)

and the currently processed pixel itself are used for performing the convolution calculation, and a processed result is obtained by averaging the convolution, which is (65*1+67*1+67*1)/3=66. When performing edge detection, the pixel is determined as the edge pixel according to the regionalized chain code of the group region 1000 and is marked with E. When performing angle calculation, an included angle formed by the currently processed pixel and its neighboring pixels (i.e. top pixel and bottom pixel) is calculated and a calculation result of 180 degrees is obtained. When performing straight line and curve line detection, the currently processed pixel is not able to be determined as a portion of a straight line or a curve line since currently only one pixel having an included angle of 90 degrees and one pixel having an included angle of 180 degrees are obtained.

In stage (3), the image processing system performs processing on the third pixel in the left column of the group region 1000. Wherein, when performing smooth processing, only the neighboring pixels (i.e. top pixel, right pixel and bottom pixel) and the currently processed pixel itself are used for performing the convolution calculation, and a processed result is obtained by averaging the convolution, which is (67*1+66*1+67*1+67*1)/4=66. When performing edge detection, the pixel is determined as the edge pixel according to the regionalized chain code of the group region 1000 and is marked with E. When performing angle calculation, an included angle formed by the currently processed pixel and its neighboring pixels (i.e. top pixel and bottom pixel) is calculated and a calculation result of 180 degrees is obtained. When performing straight line and curve line detection, a straight line having a length of 2 is determined since two pixels having an included angle of 180 degrees are obtained.

In stage (4), the image processing system performs processing on the fourth pixel in the left column of the group region 1000. Wherein, when performing smooth processing, only the neighboring pixels (i.e. top pixel and lower-right pixel) and the currently processed pixel itself are used for performing the convolution calculation, and a processing result is obtained by averaging the convolution, which is (67*1+66*1+67*1)/3=67. When performing edge detection, the pixel is determined as the edge pixel according to the regionalized chain code of the group region 1000 and is marked with E. When performing angle calculation, an included angle formed by the currently processed pixel and its neighboring pixels (i.e. top pixel and lower-right pixel) is calculated and a calculation result of 135 degrees is obtained. When performing straight line and curve line detection, the detection still remains the previously determined straight line 1 since the included angle of 135 degrees currently obtained is not corresponding to a straight line.

In stage (5), the image processing system performs processing on the most downward pixel of the group region 1000. Wherein, when performing smooth processing, only the neighboring pixel (i.e. top pixel) and the currently processed pixel itself are used for performing the convolution calculation, and a processing result is obtained by averaging the convolution, which is (66*1+69*1)/2=67. When performing edge detection, the pixel is determined as the edge pixel according to the regionalized chain code of the group region 1000 and is marked with E. When performing angle calculation, an included angle formed by the currently processed pixel and its neighboring pixels (i.e. upper-left pixel and top pixel) is calculated and a calculation result of 45 degrees is obtained. When performing straight line and curve line detection, the detection still remains the previously determined straight line 1 since the included angle of 45 degrees currently obtained is not corresponding to a straight line.

According to the aforesaid method, calculation results of stage (6) to stage (11) can be derived and it is known from the exemplary embodiment that the information of group mark and regionalized chain code obtained by the image processing system in the regionalizing pre-processing stage can be used to simultaneously perform various image processing procedures on each group region in the image without affecting characteristics of the original image.

To sum up, the image processing method and the image processing system using the regionalized structure of the disclosure transform the original image from a combination of pixel points to a combination of regions, which not only enables the subsequent basic image processing units to perform calculation based on the neighboring pixels in same region, but also simultaneously perform various basic image processing procedures without affecting the characteristics of original image. In certain application, the calculation of basic units can even be skipped, so as to directly execute advanced image processing units on the regionalized data (i.e. regionalized characteristic) calculated through the regionalizing pre-processing.

Although the disclosure has been described with reference to the exemplary embodiments thereof, it will be apparent to one of the ordinary skills in the art that modifications to the described embodiments may be made without departing from the spirit of the disclosure. Accordingly, the scope of the disclosure will be defined by the attached claims not by the above detailed description.

What is claimed is:

1. An image processing method using a regionalized architecture, comprising:
   classifying a plurality of neighboring pixels having at least one similarity characteristic in an image into a group region having the same characteristics;
   assigning a unique group mark to each of the group regions;
   describing an edge of each group region as a regionalized chain code;
   identifying each of the group regions according to the group mark and the regionalized chain code of the group region; and
   simultaneously performing at least one image processing procedure on the group regions,
   wherein the step of performing at least one image processing procedure on the group regions comprises:
   performing a convolution calculation on each of a plurality of pixels in one of the group regions, wherein when performing the convolution calculation on a currently processed pixel of the pixels, only the currently processed pixel and at least one first neighboring pixel in 4-connectivity neighboring of the currently processed pixel in the same group region as the currently processed pixel are calculated with a mask, and a second neighboring pixel in 4-connectivity neighboring of the currently processed pixel which is not in the same group region as the currently processed pixel is not calculated with the mask.

2. The image processing method as recited in claim 1, wherein the step of classifying the plurality of neighboring pixels having at least one similarity characteristic in the image into the group region having the same characteristics comprises:
   performing a quantization process on the image, so as to quantize the pixel values of a plurality of pixels in the image into a plurality of quantization values; and classifying a plurality of neighboring pixels having the same quantization value into the group region having the same characteristics.

3. The image processing method as recited in claim 1, wherein the step of assigning the unique group mark to each of the group regions comprises using a connected components labeling method to assign the unique group mark to each of the group regions.

4. The image processing method as recited in claim 1, wherein the step of describing the edge of each group region as the regionalized chain code comprises:
defining a plurality of chain codes corresponding to a plurality of different directions; and
sequentially acquiring a relative direction between two neighboring pixels along the edge of each group region in a counterclockwise direction or a clockwise direction, and recording the chain codes corresponding to the relative directions to generate the regionalized chain code.

5. The image processing method as recited in claim 4, wherein the step of sequentially acquiring a relative direction between two neighboring pixels along the edge of each group region in the counterclockwise direction or the clockwise direction, and recording the chain codes corresponding to the relative directions to generate the regionalized chain code comprises starting from the pixel in the upper-left corner of the group region.

6. The image processing method as recited in claim 4, wherein the relative direction comprises right, upper-right, upward, upper-left, left, lower-left, downward, and lower-right.

7. The image processing method as recited in claim 1, wherein the step of identifying each of the group regions according to the group mark and the regionalized chain code of the group region comprises:
sorting the group regions according to a regionalized attribute of each of the group regions; and
selecting a portion of the group regions for performing the at least one image processing procedure according to an order of the group regions.

8. The image processing method as recited in claim 7, wherein the regionalized attribute comprises a size, a circumference, or an average luminance of the group region.

9. The image processing method as recited in claim 1, wherein the step of identifying each of the group regions according to the group mark and the regionalized chain code of the group region comprises:
retrieving three connected neighboring pixels in the edge of the group region to acquire the relative direction among the three connected neighboring pixels according to the regionalized chain code of each group region, so as to calculate an included angle formed by the three connected neighboring pixels.

10. The image processing method as recited in claim 9, wherein the step of calculating the included angle formed by the three connected neighboring pixels comprises using a cosine formula.

11. The image processing method as recited in claim 9, wherein after the step of retrieving the three connected neighboring pixels in the edge of the group region to acquire the relative direction among the three connected neighboring pixels according to the regionalized chain code of each group region, so as to calculate the included angle formed by the three connected neighboring pixels, the method further comprising:
analyzing the included angles formed by the pixels in each group region to perform a straight line detection and a curve line detection.

12. The image processing method as recited in claim 11, wherein the step of analyzing the included angles formed by the pixels in each group region to perform the straight line detection comprises:
determining there is a straight line among the neighboring pixels having a length equal to a number of the neighboring pixels if the included angles among the neighboring pixels are all equal to 180 degrees.

13. The image processing method as recited in claim 11, wherein the step of analyzing the included angles formed by the pixels in each group region to perform the curve line detection comprises:
determining there is a curve line among the neighboring pixels having a length equal to a number of the neighboring pixels if the included angles among the neighboring pixels are the same but not equal to 180 degrees.

14. An image processing system using a regionalized structure, comprising:
a memory for storing a plurality of instructions; and
a processor for executing the instructions to perform a plurality of steps, the instructions comprising:
classifying a plurality of neighboring pixels having at least one similarity characteristic in an image into a group region having the same characteristics;
assigning a unique group mark to each of the group regions;
describing an edge of each group region as a regionalized chain code;
identifying each of the group regions according to the group mark and the regionalized chain code of the group region; and
simultaneously performing at least one image processing procedure on the group regions,
wherein the step of performing at least one image processing procedure on the group regions comprises:
performing a convolution calculation on each of a plurality of pixels in one of the group regions, wherein when performing the convolution calculation on a currently processed pixel of the pixels, only the currently processed pixel and at least one first neighboring pixel in 4-connectivity neighboring of the currently processed pixel in the same group region as the currently processed pixel are calculated with a mask, and a second neighboring pixel in 4-connectivity neighboring of the currently processed pixel which is not in the same group region as the currently processed pixel is not calculated with the mask.

15. The image processing system as recited in claim 14, wherein the step of classifying comprises performing a quantization process on the image so as to quantize the pixel values of a plurality of pixels in the image into a plurality of quantization values, and classifying a plurality of neighboring pixels having the same quantization values into the group region having the same characteristics.

16. The image processing system as recited in claim 14, wherein the step of assigning comprises using a connected components labeling method to assign the unique group mark to each of the group regions.

17. The image processing system as recited in claim 14, wherein the step of describing comprises defining a plurality of chain codes corresponding to a plurality of different directions and sequentially acquiring a relative direction between two neighboring pixels along the edge of each group region in a counterclockwise direction or a clockwise direction, and recording the chain codes corresponding to the relative directions to generate the regionalized chain code.

18. The image processing system as recited in claim 17, wherein the step of describing comprises sequentially acquiring the relative direction between two neighboring pixels along the edge of each group region in the counterclockwise direction or the clockwise direction starting from the pixel in the upper-left corner of the group region, and recording the chain codes corresponding to the relative directions to generate the regionalized chain code.

19. The image processing system as recited in claim 17, wherein the directions comprises right, upper-right, upward, upper-left, left, lower-left, downward, and lower-right.

20. The image processing system as recited in claim 14, wherein the steps further comprise:
    sorting the group regions according to a regionalized attribute of each of the group regions and selecting a portion of the group regions for performing the at least one image processing procedure according to an order of the group regions.

21. The image processing system as recited in claim 20, wherein the regionalized attribute comprises a size, a circumference, or an average luminance of the group region.

22. The image processing system as recited in claim 14, wherein the step of identifying comprises:
    retrieving three connected neighboring pixels in the edge of the group region to acquire relative direction among the three connected neighboring pixels according to the regionalized chain code of each group region, so as to calculate an included angle formed by the three connected neighboring pixels.

23. The image processing method as recited in claim 22, wherein the step of retrieving comprises calculating the included angle formed by the three connected neighboring pixels by using a cosine formula.

24. The image processing system as recited in claim 22, wherein the step of identifying further comprises:
    analyzing the included angles formed by the pixels in each group region and determining there is a straight line among the neighboring pixels having a length equal to a number of the neighboring pixels if the included angles among the neighboring pixels are all equal to 180 degrees.

25. The image processing system as recited in claim 22, wherein the step of identifying further comprises:
    analyzing the included angles formed by the pixels in each group region and determining there is a curve line among the neighboring pixels having a length equal to a number of the neighboring pixels if the included angles among the neighboring pixels are the same but not equal to 180 degrees.

* * * * *